Dec. 25, 1945.  W. K. CRESON  2,391,819
POWER STEERING GEAR
Filed Dec. 18, 1944  2 Sheets-Sheet 1
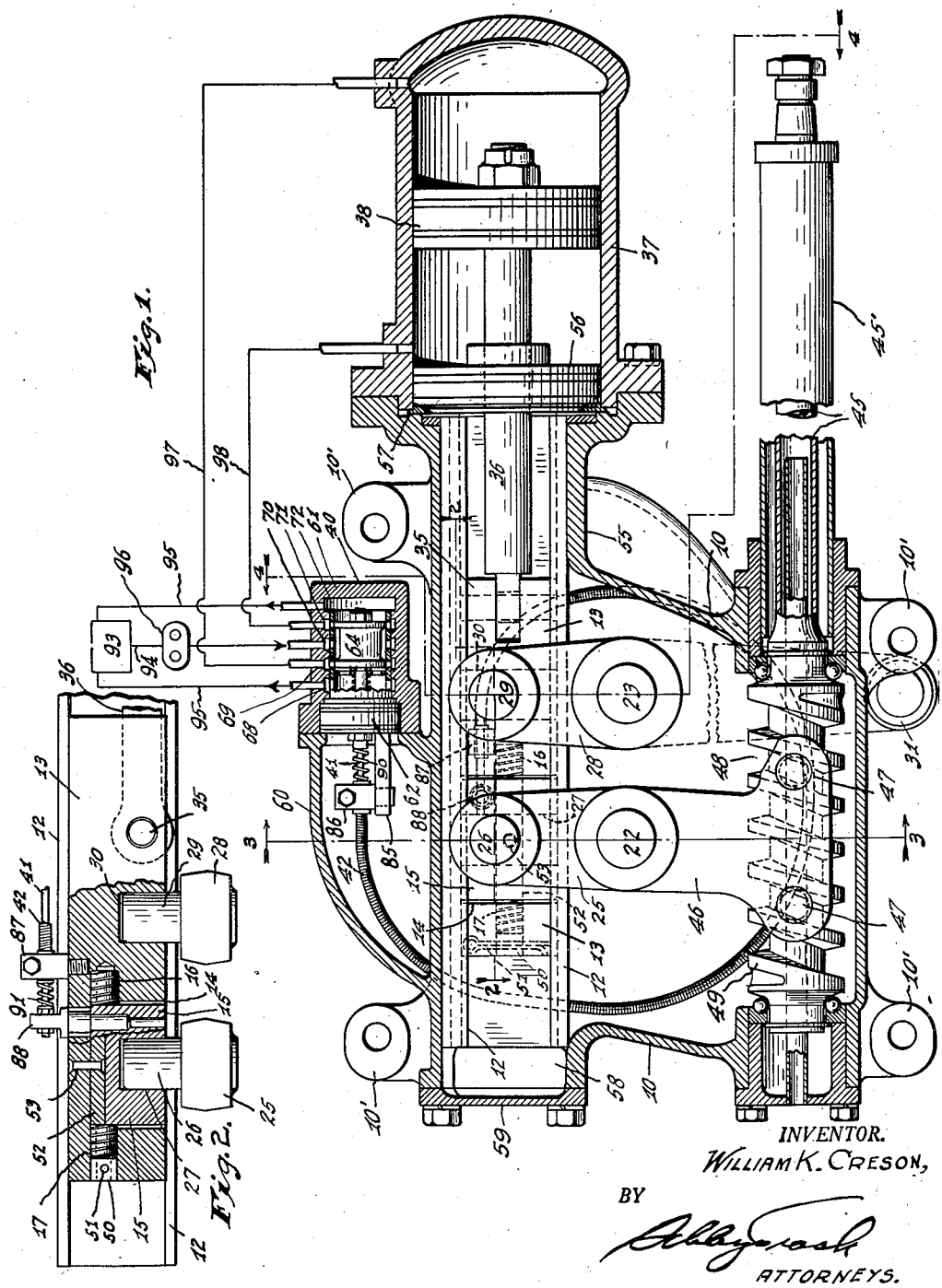
INVENTOR.
WILLIAM K. CRESON,
BY
ATTORNEYS.

Dec. 25, 1945.   W. K. CRESON   2,391,819
POWER STEERING GEAR
Filed Dec. 18, 1944   2 Sheets-Sheet 2

INVENTOR.
WILLIAM K. CRESON,
BY
ATTORNEYS.

Patented Dec. 25, 1945

2,391,819

UNITED STATES PATENT OFFICE 2,391,819

POWER STEERING GEAR

William K. Creson, La Fayette, Ind., assignor to Ross Gear & Tool Company, La Fayette, Ind., a corporation of Indiana Application December 18, 1944, Serial No. 568,685

15 Claims. (Cl. 180—79.2)

My invention relates to a power-operated steering gear for vehicles and more particularly to a steering gear in which power derived from a hydraulic system is applied to assist in moving the dirigible wheels of the vehicle when the steering effort exceeds a predetermined maximum. An object of my invention is to produce a power-operated steering gear for vehicles which will lend itself to the incorporation of hydraulic devices of standardized design. A further object of my invention is to produce a power-operated vehicle steering gear which can be simply and economically manufactured and which will be largely self-contained.

In carrying out my invention, I employ a pair of slidably mounted members one of which is connected, desirably through speed-reducing mechanism, with the manually operated steering wheel of the vehicle and the other of which is operatively connected to the dirigible supporting wheels of the vehicle and also to the piston of a hydraulic motor. Springs acting oppositely between the two slidable members tend to maintain them in a fixed relative position but permit them to move relatively to each other whenever the force transmitted from one to the other overcomes spring pressure. Fluid under pressure is supplied alternatively to one end or the other of the hydraulic motor by means of an appropriate valve mechanism operated in response to relative movement of the two slidable members previously referred to. In the preferred form of the invention, the valve is operated by a Bowden wire connected to one of the sliding members and slidable in a sheath secured to the other; and the Bowden wire, as well as the two sliding blocks and the mechanism connecting one of them with the steering shaft, are all enclosed in a common housing upon which the hydraulic motor and its control valve are mounted.

Figure 3:
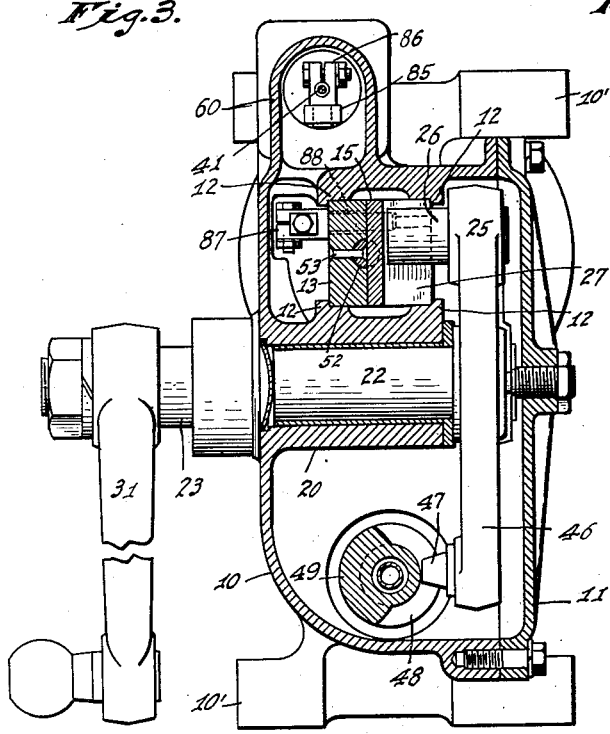
Figure 4:
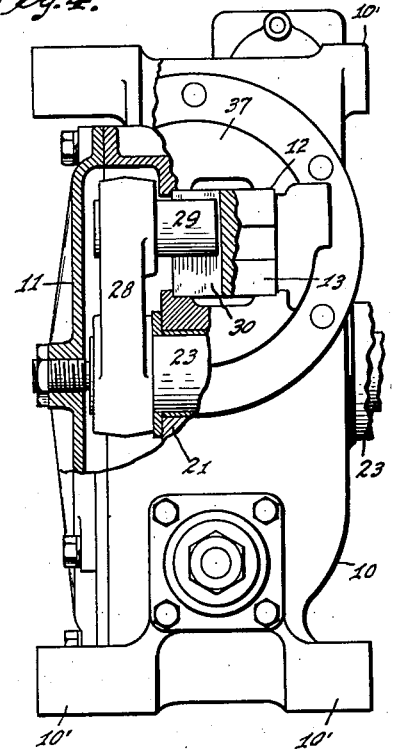
Figure 5:
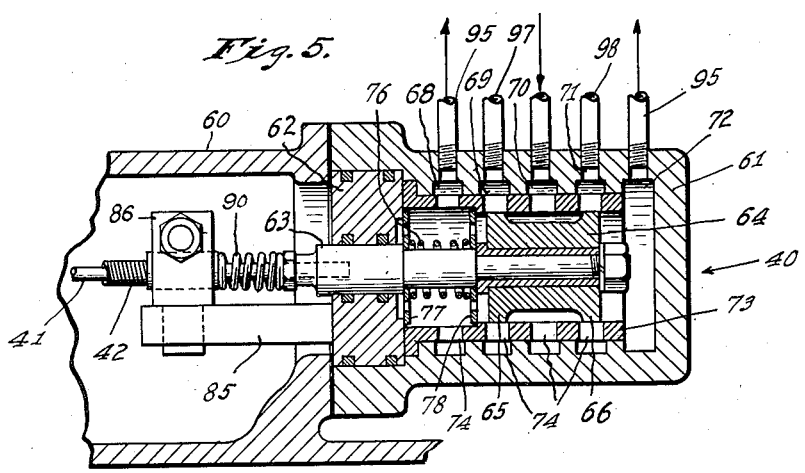

The accompanying drawings illustrate my invention: Fig. 1 is a complete vertical section through a steering gear of the preferred form; Fig. 2 is a fragmental horizontal section on the line 2—2 of Fig. 1; Figs. 3 and 4 are vertical sections on the lines 3—3 and 4—4 respectively of Fig. 1; and Fig. 5 is an axial section through the valve mechanism.

The steering gear shown in the drawings comprises an open-sided housing 10 the open side of which is closed by a cover plate 11 (Figs. 3 and 4). Exteriorly, the housing 10 is provided with drilled bosses 10' for use in mounting the steering gear in suitable position on a vehicle. The housing is formed interiorly to provide guideways 12 which slidably support an elongated block 13. The block 13 is provided in one side with a recess 14 containing a second block 15, which is shorter than the recess 14 so that it can move therein relative to the block 13. Springs 16 and 17 carried by the block 13 act oppositely on the block 15 and tend to hold it in a centered or neutral position within the recess 14.

The casing 10 is provided with bearings 20 and 21 (Figs. 3 and 4) which rotatably receive respectively two parallel shafts 22 and 23. Rigid with the shaft 22 is an arm 25 which carries at its outer end an axially projecting pin 26 slidably received in a vertical groove 27 in the block 15. The shaft 23 has rigid with it an arm 28 which carries at its outer end a pin 29 slidably received in a vertical groove 30 in the block 13. The shaft 23 projects outwardly through the rear wall of the casing 10 and there has rigidly secured to it an arm 31 adapted for connection by the customary link (not shown) to the dirigible wheels of the vehicle. The block 13 is connected, as by a pin 35, with a piston rod 36 which extends outwardly of the casing 10 and into a hydraulic cylinder 37, where a piston 38 is secured to it.

The supply of fluid under pressure to the cylinder 37 is controlled by a valve 40, and such valve is in turn controlled by a Bowden wire 41 enclosed in a sheath 42. The sheath and Bowden wire are connected to the two blocks 13 and 15 in such a way that relative movement of those two blocks from their normal relative position will operate the valve 40 and admit fluid under pressure to the cylinder 37 to move the piston 38 and block 13 in the direction necessary to restore the blocks 13 and 15 to their normal relative position.

The arm 25, which is connected to the block 15 through the medium of the pin 26 and groove 27, is operatively connected to a manually operable steering shaft 45 extending outwardly from the housing 10 through a steering post 45' of conventional form secured to the housing. As shown, the shaft 45 is operatively connected to the arm 25 through mechanism of the general type more fully shown and described in United States Letters Patent No. 2,071,235, granted February 16, 1937, on the application of P. A. Newman; but other forms of mechanism may be used. In the device shown, a downward extension 46 of the arm 25 is provided with a pair of spaced bosses 47 which are received at spaced points in a helical groove 48 of a cam member 49 rigid with the steering shaft 45.

The springs 16 and 17, which act to oppose relative movement of the blocks 13 and 15 in any direction, are desirably pre-loaded. As shown, those springs are located in a hole drilled into the block 13 from one end face thereof and positioned so that its axis will be approximately in the plane of the bottom of the notch 14 in the member 13. One of the springs, shown as the spring 16, acts between the bottom of such hole and one side face of the block 15, while the other spring 17 acts between the opposite side face of the block 15 and a plug 50 which is secured in the hole by a pin 51. In order to prevent either spring from partially offsetting the effect of the other in opposing movement of the block 15 from its neutral position, I employ a stop member 52 which is disposed in that portion of the aforesaid hole left after the notch 14 has been cut and which is secured in place in the block 13, as by means of a rivet 53. Desirably, the stop 52 has a length substantially equal to the length of the block 15, whereby the stop will hold the adjacent ends of the springs 16 and 17 far enough apart to permit insertion and removal of the block 15. At the same time, any movement of the block 15 from its neutral position will be immediately opposed by that spring toward which the block tends to move. The springs 16 and 17 are so proportioned that each will be preloaded—i. e., stressed in compression—by reason of the presence of the stop 52. As a result, no relative movement of the blocks 13 and 15 can occur until the force tending to produce such movement exceeds a predetermined value represented by the amount of preloading of the spring opposing such movement.

As will be clear from Fig. 3, the cross-sectional dimensions of the block 15 correspond substantially with those of the notch in which such block is located. As a result, the outer edges of the block 15 are received in the guides 12 which therefore serve to retain the block 15 seated in the notch 14.

The hydraulic cylinder 37 is secured to the flanged outer end of a hollow extension 55 with which the housing 10 is provided, and into which the guideways 12 extend. The inner end of the cylinder 37 is closed by a head 56 which fits within the cylinder and which is held in place through the medium of an annular flange 57 clamped between the inner end of the cylinder and the outer end of the housing-extension 55.

Opposite the extension 55, the housing 10 is provided with an opening 58 closed by a cover plate 59. The opening 58 is in alinement with the guideways 12 and large enough to receive a broach or other tool used in finishing such guideways.

The housing 10 is provided above the guideways 12 with an extension 60 upon the open end of which the valve 40 is mounted. The valve 40 comprises a cup-like casing 61 secured to the flanged, open end of the housing-extension 60. As will be clear from Fig. 5, the inner end of the casing 61 is closed by a head 62 which is provided with a central opening slidably receiving a valve stem 63. Within the casing 61, the valve stem 63 carries a spool-type valve 64 having two axially spaced annular flanges 65 and 66.

Interiorly, the casing 61 is provided with five axially spaced annular grooves or ports 68 to 72 inclusive and desirably also with a liner 73 provided in the plane of each port with holes 74 through its wall to permit fluid flow between the port and the interior of the liner. For a purpose which will hereinafter become apparent, the spacing of the valve-flanges 65 and 66 corresponds to the axial distance between the holes 74 associated with the port 69 and the holes 74 associated with the port 71, and the axial width of the flanges 65 and 66 is slightly less than the diameter of the holes 74. A compression spring 76 surrounds the valve stem 63 and co-operates, in known manner, through washers 77 and 78 with the head 62 and with properly located shoulders on the valve stem 63 and liner 73 to oppose any movement of the valve 64 from a neutral position in which the valve-flanges 65 and 66 are coplanar respectively with the ports 69 and 71.

Mounted on the head 62 and extending therefrom into the housing-extension 60 is a rigid arm 85 which carries a clamp 86 anchoring one end of the Bowden-wire sheath 42. The Bowden wire 41 projects outwardly beyond the clamp and end of the sheath, where it is firmly connected to the valve-stem 63. The opposite end of the sheath 42 is secured in a clamp 87 mounted on the block 13, while the opposite end of the wire 41 is connected to a pin 88 which is carried by the block 15 and projects through a slot in the block 13. Between its ends, the sheath 42 is disposed as a loop extending downwardly nearly to the bottom of the housing 10. This arrangement provides the Bowden wire with slack sufficient to prevent it from interfering with joint movement of the blocks 13 and 15.

Obviously, it is desirable to remove as far as possible all blacklash or lost-motion in the operative connection between the valve 64 and the blocks 13 and 15. To this end, I form the loop in the Bowden wire sheath so that it is free from any reversal of curvature, and I maintain the Bowden wire 41 under sufficient tension at all times to insure its contact with that side of the sheath which is on the inside of the loop. Such tension in the wire 41 may be created and maintained by a compression spring 90 which acts between the valve-stem 63 and the sheath 42 with a force great enough to overcome the maximum resistance to rightward movement of the valve 64. As a result of this arrangement, the Bowden wire 41 is never called upon to transmit any columnar stresses which, because of the necessary clearance between the wire and its sheath, would result in reducing the effective length of the wire and in thereby creating undesirable lost motion.

In performing the function just noted, the spring 90 tends to move the block 15 to the right in opposition to the spring 16 acting on such block. In most instances the tendency of the spring 90 to move the block 15 will be slight in comparison with the opposing preloading of the spring 16 and no steps need therefore be taken to counteract it. However, if it is desired to counteract the tendency of the spring 90 to move the block 15, a similar spring 91 may be interposed between the pin 88 and the adjacent end of the sheath 42.

As will be clear from the diagrammatic showing of Fig. 1, the two end ports 68 and 72 of the valve casing 61 are both connected by conduits 95 to a tank 93 containing a reserve supply of the liquid used in the hydraulic system. The outlet of such tank is connected by a conduit 94 with the inlet of a pump 96, while the outlet of such pump is connected to the center port 70. The port 69, lying to the left of the center port 70, is connected by a conduit 97 to the right-hand end of the hydraulic cylinder 37, while the remaining valve-port 71 is connected through a conduit 98 to the left-hand end of the cylinder 37. In a self-propelled vehicle, the pump 96 will ordinarily be driven from the vehicle engine.

The Bowden wire 41 has an effective length such that when the block 15 is in its central or neutral position in the notch 14 the valve 64 will be in its neutral position with the flanges 65 and 66 respectively coplanar with the valve-ports 69 and 71. Since, as set forth above, the width of the valve flanges is less than the diameter of the holes through the liner 73, the opening of the ports 69 and 71 into the interior of the liner is not completely occluded, those ports communicate with each other as well as with the ports 68, 70, and 72, and fluid can circulate from the pump 95 through the port 70, into the liner between the flanges 65 and 66, over the edges of such flanges, and thence through the ports 68 and 72, conduits 95, and tank 93 to the inlet side of the pump. In addition, the opposite ends of the cylinder 37 communicate with each other through the conduits 97 and 98 and the ports 69 and 71. This latter intercommunication permits the piston 38 to be moved by movement of the block 13. This condition obtains as long as the block 15 remains in its neutral position in the notch 14.

In the operation of steering the vehicle, the steering shaft 45 is rotated to swing the arm 25—46 in one direction or the other. The block 15 will follow movements of the pin 26 on the arm 25, the block 13 will follow the block 15 to move the dirigible wheels, and the valve 64 will remain in its neutral position as long as the force transmitted between the two blocks does not exceed that represented by the pre-loading of the springs 16 and 17. Since, with the valve in its neutral position, the opposite ends of the cylinder 37 are interconnected through the conduits 97 and 98, the partially occluded ports 69 and 71, and the interior of the liner 73, fluid pressure within the cylinder 37 will not materially oppose movement of the block 13.

Should the force transmitted between the blocks 13 and 15 become sufficient at any time to compress one or the other of the springs 16 and 17, movement of the Bowden wire in its sheath and consequent displacement of the valve 64 would result. Thus, if the steering shaft 45 is being rotated to produce rightward (Figs. 1 and 2) movement of the block 15 and the force opposing such movement of the block is sufficient to overcome the pre-loading of the spring 16, that spring will yield and permit the block 15 to move to the right in the notch 14. Such relative movement of the blocks 13 and 15, transmitted to the valve stem 63 through the Bowden wire, will cause the valve 64 to be moved to the right, thereby closing the communication previously existing between the valve ports 69 and 70 and opening both the communication between the valve ports 70 and 71 and the communication between the ports 68 and 69. As a result, the fluid supplied to the valve casing through the port 70 can no longer escape to the outlet ports 68 and 72 and will be compelled to flow through the port 71 and conduit 98 into the left-hand end of the cylinder 37, where it will force the piston 38 to the right. Fluid displaced from the right-hand end of the cylinder 37 by such movement of the piston flows through the conduit 97 and ports 69 and 68 to the tank 93.

In its rightward movement above described, the piston 38 carries the block 13 with it, and thus tends to restore the block 15 to its neutral position in the notch 14. However, if the block 13 is being moved to the right by rotation of the steering shaft 45 at a rate sufficient to keep the spring 16 compressed, the pump 96 will continue to supply fluid to the left-hand end of the cylinder 37 and the piston will continue to move to the right. When rotation of the steering shaft 45 is interrupted, the block 15 becomes stationary; and a slight further movement of the piston 38 to the right will restore the block 15 to its neutral position in the notch 14, thus causing the valve 64 to assume its normal position in which no movement of the piston 38 is produced.

If the steering shaft 45 is operated to move the block 15 to the left with a force sufficient to compress the spring 17, the valve 64 will be moved to the left to cause the supply of fluid under pressure to the right-hand end of the cylinder 37. Such fluid will force the piston 38 and block 13 to the left and will continue to do so as long as the block 15 maintains the spring 17 in compression.

If the force tending to displace the blocks 13 and 15 originates at the dirigible vehicle wheels so that it will be applied to the block 13, the consequences will depend upon whether or not that force is great enough to compress one or the other of the springs 16 and 17. If it is not great enough to compress one of such springs, it will be transmitted through the block 15 to the arm 25—46, and thence, in reduced amount, through the worm 49 to the steering shaft, where it will be counteracted by the operator. If, on the other hand, the disturbing force is great enough to compress one or the other of the springs 16 and 17 relative movement of the blocks 13 and 15 will occur, and the valve 64 will be displaced to permit the entry into the cylinder 37 of fluid opposing displacement of the block 13.

From the above description of the operation of the device illustrated, it will be clear that until the effort exerted on the dirigible wheels exceeds a predetermined maximum determined by the degree to which the springs 16 and 17 are preloaded, the device will operate as an ordinary manually operated steering gear. Road reactions on the dirigible wheels will be transmitted to the steering shaft 45 and sensed by the operator, although such road reactions will be reduced in amount in proportion to the mechanical advantage provided by the worm 49. However, when the effort required to move the dirigible wheels or to hold them in the desired position becomes sufficient to overcome the preloading of either of the springs 16 and 17, the valve 64 will be displaced in a way which will cause the hydraulic motor to assist the operator.

I claim as my invention:

1. In a power-operated steering gear, a housing adapted for mounting on a vehicle frame, guides within said housing, two members slidable longitudinally in said guides and capable of limited relative longitudinal movement, preloaded spring means acting between said members and biasing them toward a neutral relative position between the limits of their relative longitudinal movement, a steering shaft rotatably mounted in said housing, a hydraulic motor having a piston and a piston-receiving cylinder mounted on said housing, valve means mounted on said housing for selectively controlling the flow of fluid under pressure to opposite ends of said cylinder, speed-reducing power-transmitting means disposed within said housing and operatively connecting said shaft with one of said slidable members, the other of said slidable members being adapted for operative connection to dirigible vehicle wheels and being operatively connected to said piston to be moved thereby, a flexible sheath having one end secured to one of said slidable members and its opposite end secured to a stationary point within said housing adjacent said valve means, and a wire extending through said sheath and operatively connected to the other of said slidable members and to said valve means.

2. The invention set forth in claim 1 with the addition that said sheath is disposed as a loop free from any reversal of curvature, and spring means acting between said sheath and the wire at opposite ends of the sheath for maintaining the wire under tension at all times.

3. The invention set forth in claim 1 with the addition that said sheath is disposed as a loop free from any reversal of curvature.

4. In a power-operated steering gear, a housing adapted for mounting on a vehicle frame, guides within said housing, two members slidable longitudinally in said guides and capable of limited relative longitudinal movement, preloaded spring means acting between said members and biasing them toward a neutral relative position between the limits of their relative longitudinal movement, a steering shaft rotatably mounted in said housing, a hydraulic motor having a piston and a piston-receiving cylinder mounted on said housing, valve means mounted on said housing for selectively controlling the flow of fluid under pressure to opposite ends of said cylinder, speed-reducing power-transmitting means disposed within said housing and operatively connecting said shaft with one of said slidable members, the other of said slidable members being adapted for operative connection to dirigible vehicle wheels and being operatively connected to said piston to be moved thereby, and mechanism within said housing controlling said valve means in response to relative movement of said two slidable members.

5. In a power-operated steering gear, a housing adapted for mounting on a vehicle frame, guides within said housing, two members slidable longitudinally in said guides and capable of limited relative longitudinal movement, spring means acting between said members and biasing them toward a neutral relative position between the limits of their relative longitudinal movement, a steering shaft rotatably mounted in said housing, a hydraulic motor having a piston and a piston-receiving cylinder mounted on said housing, valve means mounted on said housing for selectively controlling the flow of fluid under pressure to opposite ends of said cylinder, speed-reducing power-transmitting means disposed within said housing and operatively connecting said shaft with one of said slidable members, the other of said slidable members being adapted for operative connection to dirigible vehicle wheels and being operatively connected to said piston to be moved thereby, and mechanism within said housing controlling said valve means in response to relative movement of said two slidable members.

6. In a power-operated steering gear, a housing adapted for mounting on a vehicle frame, guides within said housing, two members slidable longitudinally in said guides and capable of limited relative longitudinal movement, preloaded spring means acting between said members and biasing them toward a neutral relative position between the limits of their relative longitudinal movement, a steering shaft rotatably mounted in said housing, a hydraulic motor having a piston and a piston-receiving cylinder mounted on said housing, valve means mounted on said housing for selectively controlling the flow of fluid under pressure to opposite ends of said cylinder, means disposed within said housing and operatively connecting said shaft with one of said slidable members, the other of said slidable members being adapted for operative connection to dirigible vehicle wheels and being operatively connected to said piston to be moved thereby, a flexible sheath having one end secured to one of said slidable members and its opposite end secured to a stationary point within said housing adjacent said valve means, and a wire extending through said sheath and operatively connected to the other of said slidable members and to said valve means.

7. In a power-operated steering gear, a housing adapted for mounting on a vehicle frame, guides within said housing, two members slidable longitudinally in said guides and capable of limited relative longitudinal movement, spring means acting between said members and biasing them toward a neutral relative position between the limits of their relative longitudinal movement, a steering shaft rotatably mounted in said housing, a hydraulic motor having a piston and a piston-receiving cylinder mounted on said housing, valve means mounted on said housing for selectively controlling the flow of fluid under pressure to opposite ends of said cylinder, means disposed within said housing and operatively connecting said shaft with one of said slidable members, the other of said slidable members being adapted for operative connection to dirigible vehicle wheels and being operatively connected to said piston to be moved thereby, and mechanism within said housing controlling said valve means in response to relative movement of said two slidable members.

8. In a power-operated steering gear, a pair of associated members capable of limited relative movement, means supporting said members for joint movement, yielding means acting between said members and biasing them toward a neutral relative position between the limits of their relative movement, a rotatable steering shaft, a hydraulic motor having a movable element, valve means for controlling the operation of said hydraulic motor, speed-reducing power-transmitting means operatively connecting said shaft with one of said associated members, the other of said members being adapted for connection to dirigible vehicle wheels and operatively connected to the movable element of said hydraulic motor to be moved thereby, a flexible sheath having one end connected to one of said associated members and its opposite end stationarily anchored adjacent said valve means, a wire extending through said sheath and operatively connected to the other of said associated members and to said valve means, and yielding means acting on said wire to maintain it in tension at all times.

9. In a power-operated steering gear, a pair of associated members capable of limited relative movement, means supporting said members for joint movement, yielding means acting between said members and biasing them toward a neutral relative position between the limits of their relative movement, a power-operated device having a movable element, a rotatable steering shaft, control means for controlling the operation of said power-operated device, speed-reducing power-transmitting means operatively connecting said shaft with one of said associated members, the other of said members being adapted for connection to dirigible vehicle wheels and operatively connected to the movable element of said power-operated device to be moved thereby, a flexible sheath having one end connected to one of said associated members and its opposite end stationarily anchored adjacent said control means, a wire extending through said sheath and operatively connected to the other of said associated members and to said control means, and yielding means acting on said wire to maintain it in tension at all times.

10. In a power-operated steering gear, a pair of associated members capable of limited relative movement, means supporting said members for joint movement, yielding means acting between said members and biasing them toward a neutral relative position between the limits of their relative movement, a power-operated device having a movable element, a rotatable steering shaft, control means for controlling the operation of said power-operated device, means operatively connecting said shaft with one of said associated members, the other of said members being adapted for connection to dirigible vehicle wheels and operatively connected to the movable element of said power-operated device to be moved thereby, a flexible sheath having one end connected to one of said associated members and its opposite end stationarily anchored adjacent said control means, a wire extending through said sheath and operatively connected to the other of said associated members and to said control means, and yielding means acting on said wire to maintain it in tension at all times.

11. The invention set forth in claim 10 with the addition that said sheath is disposed in a loop free from any reversal of curvature.

12. In a power-operated steering gear, a housing adapted for mounting on a vehicle frame and provided with alined openings in opposite walls, rectilinear guides within said housing in alinement with said openings, a block longitudinally slidable in said guides and provided between its ends with a laterally opening notch, the dimensions of said openings being such that said block can be inserted longitudinally into said guides through either opening, a second block confined in said notch by said guides and movable longitudinally in said notch relative to said first block, a closure for one of said openings, a rod secured to said first block and extending through the other of said openings, a piston on said rod, a hydraulic cylinder removably mounted on said housing and slidably receiving said piston, valve means for selectively controlling the flow of fluid under pressure to opposite ends of said cylinder and responsive to relative movement of said two blocks, yielding means acting between said two blocks and biasing the second block toward a neutral position between the ends of said notch, and a steering shaft rotatably mounted in said housing and operatively connected to said second block, said first block being adapted for connection to dirigible vehicle wheels.

13. In a power-operated steering gear, a housing adapted for mounting on a vehicle frame, rectilinear guides within said housing, a block longitudinally slidable in said guides and provided between its ends with a laterally opening notch, a second block movable longitudinally in said notch relative to said first block, a hydraulic cylinder mounted on said housing in alinement with said guides, a piston in said cylinder operatively connected to said first block, valve means for selectively controlling the flow of fluid under pressure to opposite ends of said cylinder and responsive to relative movement of said two blocks, yielding means acting between said two blocks and biasing the second block toward a neutral position between the ends of said notch, and a steering shaft rotatably mounted in said housing and operatively connected to said second block, said first block being adapted for connection to dirigible vehicle wheels.

14. In a power-operated steering gear, a housing adapted for mounting on a vehicle frame, rectilinear guides within said housing, a block longitudinally slidable in said guides and provided between its ends with a laterally opening notch, a second block movable longitudinally in said notch relative to said first block, a power-operated device having a movable element operatively connected to said first block, control means responsive to relative movement of said two blocks for controlling said power-operated device, yielding means acting between said two blocks and biasing the second block toward a neutral position between the ends of said notch, and a steering shaft rotatably mounted in said housing and operatively connected to said second block, said first block being adapted for connection to dirigible vehicle wheels.

15. In a power-operated steering gear, a housing adapted for mounting on a vehicle frame, rectilinear guides within said housing, a block longitudinally slidable in said guides, a second block capable of limited longitudinal movement relative to said first block, yielding means acting between said blocks and biasing them toward a neutral relative position between the limits of their relative movement, said blocks being provided with parallel grooves normal to their path of movement, a shaft projecting through a wall of said housing, said shaft being provided outside said housing with a rigid arm adapted for connection to dirigible vehicle wheels and inside said housing with a second rigid arm having a pin received in the groove of said first block, a steering shaft, means including an arm pivotally mounted in said housing and provided with a pin disposed in the groove of said second block for operatively connecting said steering shaft with said second block, a power-operated device for moving said first block, and means responsive to relative movement of said two blocks for controlling operation of said power-operated device.

WILLIAM K. CRESON.